United States Patent
Kim et al.

(10) Patent No.: US 6,697,986 B2
(45) Date of Patent: Feb. 24, 2004

(54) DATA TRANSMISSION APPARATUS AND METHOD FOR AN HARQ DATA COMMUNICATION SYSTEM

(75) Inventors: Min-Goo Kim, Suwon-shi (KR); Se-Hyoung Kim, Seoul (KR); Soon-Jae Choi, Songnam-shi (KR); Beong-Jo Kim, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 381 days.

(21) Appl. No.: 09/863,110

(22) Filed: May 22, 2001

(65) Prior Publication Data

US 2002/0015419 A1 Feb. 7, 2002

(30) Foreign Application Priority Data

May 22, 2000 (KR) .......................... 2000/28477

(51) Int. Cl.[7] ............................................. H03M 13/00
(52) U.S. Cl. ........................................ 714/751; 714/758
(58) Field of Search ................................. 714/774, 790, 714/752, 751, 758, 748

(56) References Cited

U.S. PATENT DOCUMENTS

| | | | | |
|---|---|---|---|---|
| 5,828,677 A | * | 10/1998 | Sayeed et al. | 714/774 |
| 5,850,405 A | * | 12/1998 | Wimmer et al. | 714/790 |
| 6,421,803 B1 | * | 7/2002 | Persson et al. | 714/752 |
| 6,519,731 B1 | * | 2/2003 | Huang et al. | 714/751 |

* cited by examiner

*Primary Examiner*—David Ton
(74) *Attorney, Agent, or Firm*—Dilworth & Barrese LLP

(57) ABSTRACT

Disclosed is an apparatus for transmitting a sequence of information bits and sequences of parity bits to a receiver in a transmitter of an HARQ transmission system. A turbo encoder receives a sequence of L information bits, and generates the sequence of information bits and M sequences of L parity bits for the information bits, wherein M is determined depending on a transmission code rate. A redundancy selector includes the sequence of information bits in an initial data block during initial transmission, and uniformly includes non-transmitted parity bits out of parity bits provided from each sequence of the parity bits in a retransmission data block upon every receipt of a retransmission request from the receiver.

19 Claims, 10 Drawing Sheets

DATA TRANSMISSION APPARATUS AND METHOD FOR AN HARQ DATA COMMUNICATION SYSTEM

PRIORITY

This application claims priority to an application entitled "Data Transmission Apparatus and Method for an HARQ Data Communication System" filed in the Korean Industrial Property Office on May 22, 2000 and assigned Serial No. 2000-28477, the contents of which are hereby incorporated by reference.

BACKGROUND OF THE INVENTION

1. Field of the Invention

The present invention relates generally to a data transmission apparatus and method in a radio communication system, and in particular, to an apparatus and method for managing retransmission of data which is subjected to transmission error during data transmission.

2. Description of the Related Art

In a radio communication system, linear block codes such as convolutional codes and turbo codes, for which a single decoder is used, are chiefly used for channel coding. Meanwhile, such a radio communication system employs an HARQ (Hybrid Automatic Repeat Request) Type I using the ARQ (Automatic Repeat Request) scheme which requires retransmission of data packets upon detection of an FEC (Forward Error Correction) code and an error. The radio communication system includes a satellite system, an ISDN (Integrated Services Digital Network) system, a digital cellular system, a CDMA-2000 (Code Division Multiple Access-2000) system, a UMTS (Universal Mobile Telecommunication System) system and an IMT-2000 (International Mobile Telecommunication-2000) system, and the FEC code includes the convolutional code and the turbo code.

The above-stated hybrid ARQ scheme is generally divided into HARQ Type I, HARQ Type II and HARQ Type III. At present, most of the multi-access schemes and the multi-channel schemes using the convolutional codes or the turbo codes employ the HARQ Type I. That is, the multi-access and multi-channel schemes of the radio communication system using the above-stated channel coding scheme, employ the HARQ Type I as an ARQ scheme for increasing the data transmission efficiency, i.e., throughput of the channel coding scheme and improving the system performance.

A principle of the first ARQ scheme is based on the fact that the channel encoder using the convolutional code, the turbo code or the linear block code has a constant code rate. FIGS. 1A and 1B illustrate a conceptual data process flow by the HARQ Type I.

Commonly, a transmitter of a radio communication system combines L-bit transmission data with a CRC (Cyclic Redundancy Check) code for error correction and then codes the combined data, L+CRC, through channel coding. The transmitter performs a separate processing process on the coded data, $(L+CRC) \times R^{-1}$, and then, transmits the processed data through an assigned channel. Meanwhile, a receiver of the radio communication system acquires the original L-bit data and the CRC code through a reverse operation of the transmitter, and transmits a response signal ACK/NAK to the transmitter according to the CRC check results.

This will be described in more detail with reference to FIG. 1A. a CRC encoder 110 receives an L-bit source data packet and encodes the received data using a CRC code, creating a coded data block, L+CRC. Commonly, CRC bits are added to the input data before channel encoding. A channel encoder 112 performs channel coding on the coded data block, L+CRC, creating a channel-coded data block, $(L+CRC) \times R^{-1}$. The channel-coded data block $(L+CRC) \times R^{-1}$, is provided to a specific channel through other function blocks 114 necessary for multiplexing.

Other inverse function blocks 116 necessary for demultiplexing in a receiver receiving the coded data block through the specific channel, demultiplex the received coded data block and output a received channel-coded data block, $(L+CRC) \times R^{-1}$. A channel decoder 118 then performs channel decoding on the received channel-coded data block, $(L+CRC) \times R^{-1}$, and outputs a channel-decoded data block, L+CRC. A CRC decoder 120 performs CRC checking on the channel-decoded data block, L+CRC, to acquire the original data, i.e., the L-bit source data packet. After completion of CRC checking, the CRC decoder 120 performs CRC checking using the CRC decoding results, thereby to determine whether the source data packet has transmission errors.

If no error is detected through the CRC check, the receiver provides the source data packet to an upper layer and transmits a confirm signal ACK (Acknowledgement) acknowledging the source data packet to the transmitter. However, upon detecting an error through the CRC check, the receiver transmits a confirm signal NAK (Not-Acknowledgement) requesting retransmission of the source data packet to the transmitter.

After transmitting the channel-coded data block, the transmitter receives the confirm signal ACK/NAK from the receiver in response to the transmitted data block. Upon receipt of the confirm signal NAK, the transmitter retransmits the corresponding data block in the above-described operation. The transmission scheme includes Stop-and-Wait ARQ, Go-Back-N ARQ, and Selective-Repeat ARQ schemes. The detailed description of the retransmission schemes will be omitted.

FIG. 1B illustrates a conceptional transmission procedure of the source data packet between the transmitter and the receiver. In FIG. 1B, the transmitter retransmits the coded data block upon every receipt of m NAKs from the receiver.

As an example of such a procedure, in an air interface of the 3GPP-2 ($3^{rd}$ Generation Project Partnership-2; a standard for a synchronous CDMA system) mobile communication system (hereinafter, referred to as "CDMA-2000" system), the multi-access scheme and the multi-channel scheme of the system employ the HARQ Type I in order to increase data transmission efficiency of the channel coding scheme and to improve the system performance. In addition, in an air interface of the 3GPP ($3^{rd}$ Generation Project Partnership; a standard for an asynchronous CDMA system) mobile communication system (hereinafter, referred to as "UMTS system") the multi-access scheme and the multi-channel scheme of the system employ the HARQ Type I in order to increase data transmission efficiency of the channel coding scheme and to improve the system performance.

However, the HARQ Type I has the following disadvantages.

First, the HARQ Type I has higher throughput, compared with a pure ARQ scheme. However, as a signal-to-noise ratio (S/N) of a signal is increased more and more, the throughput becomes saturated to a code rate R of the FEC code, thus resulting in a reduction in the throughput as compared with the pure ARQ. That is, the throughput cannot approach to 1.0 (100%) even at a very high S/N. Such a problem is shown by a characteristic curve of the HARQ Type I in FIG. 2. That is, as for the HARQ Type I, the throughput is saturated to the code rate R (<1.0) as shown in FIG. 2, so that it cannot approach to 1.0.

Second, the HARQ Type I improves the throughput by performing error correction using the FEC code, compared with the pure ARQ. However, since the HARQ Type I uses a constant redundancy, i.e., constant code rate regardless of a variation in S/N, it has low transmission efficiency. Therefore, the HARQ Type I cannot adaptively copes with variation of the channel condition, thus causing a decrease in the data rate.

To solve theses problems, the HARQ Type II and the HARQ Type III are used. The HARQ Type II and the HARQ Type III have an adaptive structure which adaptively determines an amount of the redundancy used for the FEC code according to how good the channel condition is. Therefore, the HARQ Type II and the HARQ Type III have the improved throughput, compared with the HARQ Type I. That is, the adaptive structure reduces the amount of the redundancy to the minimum, so that as S/N of the signal is increased more and more, the code rate R of the FEC code approaches to 1, thereby enabling the throughput to approach to 1. Meanwhile, the adaptive structure performs optimal error correction such that if SIN of the signal is decreased, the amount of the redundancy is increased to the maximum to enable the code rate R of the FEC code to approach to 0, or the redundancy is repeated so as not to enable the throughput to approach to 0. Accordingly, the HARQ Type II and the HARQ Type III have the improved throughput at both the low S/N and the high S/N.

Here, a difference between the HARQ Type II and the HARW Type III is as follows.

The HARQ Type II sets an initial code rate RI to 1 or a value slightly less than 1 before transmitting the data block, and thereafter, retransmits only the redundancy whose code rate is always higher than 1. Therefore, the HARQ Type II cannot perform decoding using only the second transmitted redundancy or the third transmitted redundancy, and should perform decoding by combining the previously transmitted data block (or redundancy). On the other hand, the HARQ Type III sets the initial code rate RI to a value lower than 1 before transmitting the data block, and even thereafter, transmits the redundancy whose code rate is lower than 1. Therefore, the HARQ Type III can perform decoding using only the second transmitted redundancy or the third transmitted redundancy respectively.

However, compared with the HARQ Type II, the HARQ Type III has the low throughput in a good channel condition. In addition, a code structure used in the HARQ Type III includes a complementary code. However, the HARQ Type III does not always use this code, and can also use a given code whose code rate is higher than 1.

Meanwhile, what is most important in the HARQ Type II and the HARQ Type III is to determine a size of first transmitted coded data block for one input data block (hereinafter, referred to as "source data packet") to be transmitted, its associated code rate and coding scheme, and determine a size of a coded data block used during each retransmission, its associated code rate and coding scheme. For example, assuming that mother code of an original channel encoder has a code rate R=⅓ and the system can retransmit each coded data block three times, the code rate result for each retransmission can be determined as shown in Table 1 below.

TABLE 1

| Code Rate | First Redundancy Version | Second Redundancy Version | Third Redundancy Version |
|---|---|---|---|
| 1/3 | 1 | 1/2 | 1/3 |

The second redundancy version has code rate ½ in the table 1, but it means making the code rate ½ by first and second redundancy transmission. And the third redundancy version has code rate ⅓ in the table 1, but it means making the code rate ⅓ by first, second and third redundancy transmission. Therefore, the code rate of each transmission can be same.

Even when the code rate for each retransmission is determined as shown in Table 1, there are various ways to determine which one of the redundancy bits derived from the mother code corresponding to the respective code rates is to be transmitted during the second retransmission and which one of the redundancy bits is to be transmitted during the third retransmission. In some cases, there is a great difference between the deteriorated performance and the improved performance, caused by the selected redundancy bits. Therefore, selecting the redundancy bits guaranteeing the optimal performance is a very important factor.

However, there has been proposed no concrete design rule for the case where the multi-access scheme and the multi-channel scheme of the 3GPP-2 CDMA-2000 system including the existing data communication system employ the channel coding scheme, or where the multi-access scheme and the multi-channel scheme of the 3GPP UMTS system employ the HARQ Type II and the HARQ Type III. That is, a rare research has been carried out on the HARQ Type II and the HARQ Type III for providing the optimal performance by combining the convolutional code or the turbo code with the ARQ scheme, for the systems using the multi-access scheme and the multi-channel scheme.

In particular, regarding the air interface standard for the 3GPP-2 CDMA-2000 system, research has been carried out on the application of the HARQ Type II and the HARQ Type III to increase the data transmission efficiency at the data transmission channel and to improve the system performance. This technical field is related to the FEC code and the ARQ scheme, which are closely connected with an increase in reliability and an improvement in the throughput of the digital communication system. That is, this field is related to performance improvement of the next generation system as well as the existing digital communication system.

The HARQ Type II and the HARQ Type III used by the current data communication systems must be constructed to reflect the following conditions in order to resolve the performance problems and guarantee the optimal performance. Generally, in the multi-access scheme and the multi-channel scheme of the system employing a channel encoder which uses the convolutional codes and the turbo codes or the linear block codes for channel coding, a variable rate transmission scheme is typically used to increase data transmission efficiency of the channel coding scheme and improve the system performance. In this case, symbol puncturing or symbol repetition is generally used.

The following conditions should be duly considered and reflected in order to guarantee performance of the FEC code.

First, the coded symbols output from the encoder are punctured using a uniform puncturing pattern, i.e., a periodic pattern, if possible, and the period (or cycle) of the puncturing pattern should be minimized. Second, the number of puncturing bits should be minimized, if possible. Third, the coded symbols output from the encoder are repeated using a uniform repetition pattern, i.e., a periodic pattern, if possible, and the period of the repetition pattern should be minimized. Finally, the number of the repetition bits should be maximized, if possible.

In addition, concatenated codes such as turbo codes using reiterative decoding may have the following disadvantages. Determining to which component decoder of the reiterative decoder the redundancy transmitted during each retransmission belongs is a very important factor in determining performance of the FEC code. Retransmission of the redundancy should be performed considering this.

As mentioned above, the conventional data communication system has the following disadvantages.

First, there has been proposed no concrete design rule for the case where the multi-access scheme and the multi-channel scheme of the CDMA-2000 system including the conventional data communication system employ the channel coding scheme, or where the multi-access scheme and the multi-channel scheme of the UMTS system employ the HARQ Type II and the HARQ Type III.

Second, what is most important in the HARQ Type III and the HARQ Type III is to determine a size of first transmitted coded data block for a source data packet, its associated code rate and coding scheme, and determine a size of a coded data block used during each retransmission, its associated code rate and coding scheme. However, the conventional data communication system is not provided with a rule for determining the code rate.

Third, the HARQ Type III and the HARQ Type III generally employ symbol puncturing or symbol repetition for redundancy selection. In this case, the above-mentioned conditions should be duly considered and reflected to guarantee performance of the FEC code. However, such conditions are not specifically reflected in the existing technology.

Fourth, the conventional HARQ Type II and HARQ Type III employs a method for basically regarding the whole codes as one unit and separating the redundancy from this, from the viewpoint of the system using the FEC code used for a single decoder. However, this should be differently interpreted in the case of the FEC code using the iterative decoding such as the turbo codes. That is, the redundancy should be selected to be optimal to the decoding method of the iterative decoder. The redundancy should not be separated simply from the viewpoint of the encoder.

SUMMARY OF THE INVENTION

It is, therefore, an object of the present invention to provide an apparatus and method for most efficiently embodying the conditions necessary for HARQ Type II and HARQ Type III.

It is another object of the present invention to provide a hybrid ARQ scheme for improving performance of a radio communication system through efficient combination of a channel coding scheme and an ARQ scheme in a multi-access scheme and a multi-channel scheme of the system.

It is further another object of the present invention to provide a hybrid ARQ scheme showing optimal performance in a radio communication system using convolutional codes, turbo codes or linear block codes.

It is still another object of the present invention to provide a method for determining a size of a first transmitted data block for a source data packet, its associated code rate and code, and also determining a size of a data block used for retransmission, its associated code rate and coding scheme.

To achieve the above and other objects, there is provided a method for transmitting a coded data, L information bits and sequences of parity bits, in an HARQ transmission system including a turbo encoder for receiving L input information bits and generating the L information bits and M ($\geq 2$) sequences of L parity bits for the information bits. The method comprises transmitting the L information bits and part of sequences of the parity bits determined by one of two integers closer to (N1−L)/M where N1 indicates a number of transmission bits given when an initial transmission code rate of the turbo encoder is below 1 during initial transmission; and at a receiver's retransmission request due to failure to receive the information bits transmitted during the initial transmission, transmitting sequences of parity bits determined by one of two integers closer to N2/M where N2 indicates a number of the transmission bits given when a retransmission code rate of the turbo encoder is below 1.

Further, the system transmits the L information bits when the initial transmission code rate of the turbo encoder is 1 during initial transmission, and transmits part of sequence of L parity bits determined by adding up L/M parity bits provided from said each sequence of parity bits at a receiver's retransmission request due to failure to receive the information bits transmitted during the initial transmission.

Preferably, the initial transmission code rate of the turbo encoder during the initial transmission is determined by predetermined maximum throughput of the turbo encoder.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1A:
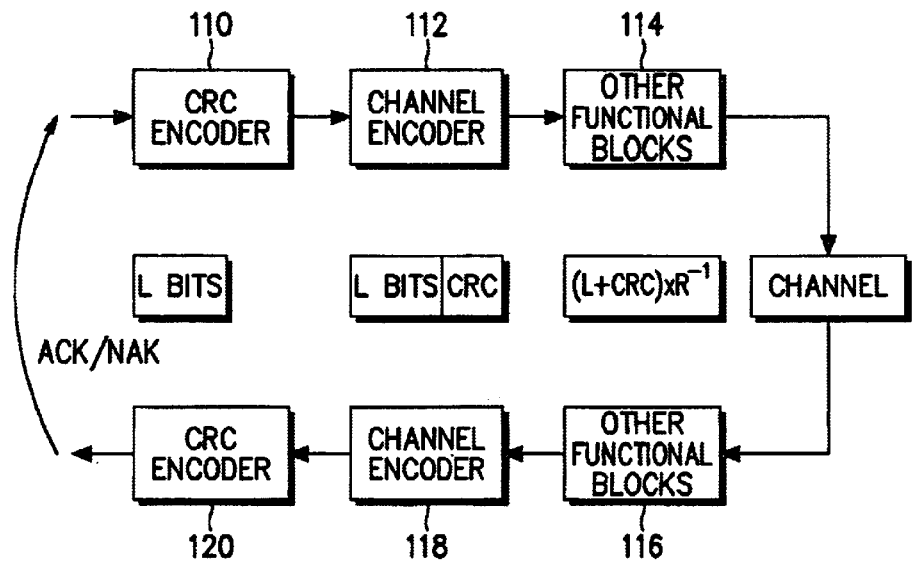
FIG. 1A is a diagram illustrating structures of a transmitter and a receiver for processing data based on a common HARQ Type I.
Figure 1B:
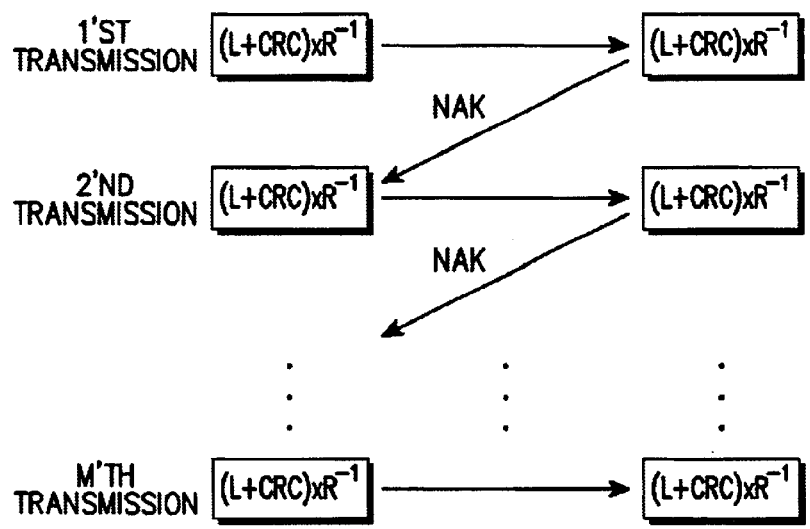
FIG. 1B is a diagram illustrating a conceptional data processing flow based on the common HARQ Type I.
Figure 2:
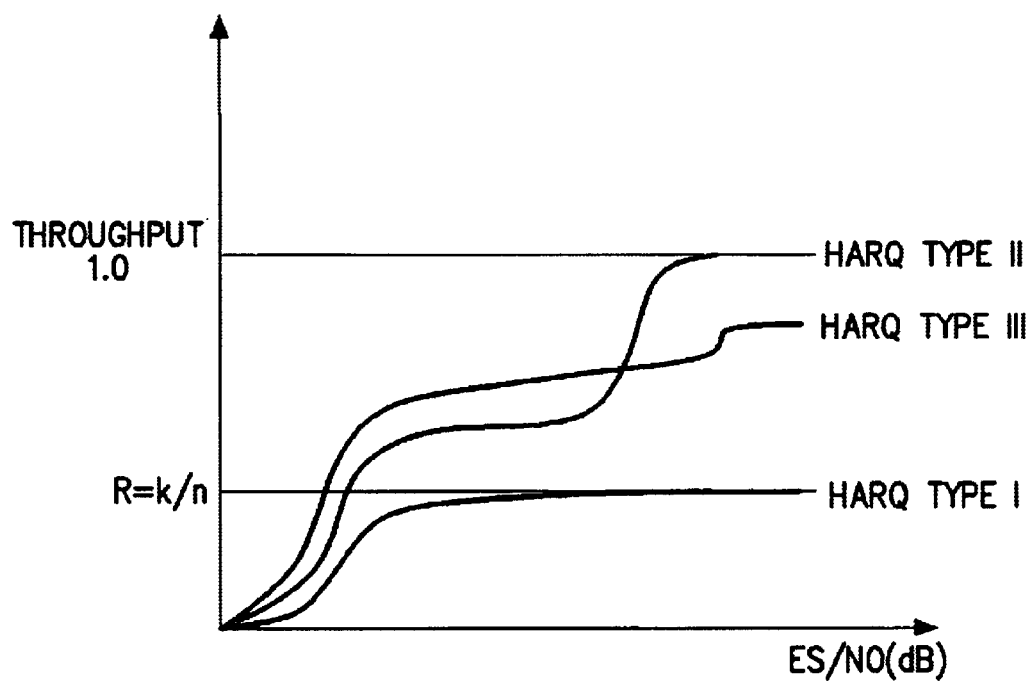
FIG. 2 is a graph illustrating the relationship between an S/N ratio and a throughput in common hybrid ARQ types.

A preferred embodiment of the present invention will be described herein below with reference to the accompanying drawings. In the following description, well-known functions or constructions are not described in detail since they would obscure the invention in unnecessary detail.

The present invention provides a method for improving of the existing hybrid ARQ scheme using the convolutional codes, the turbo codes or the linear block codes. To this end, the HARQ Type I is first analyzed to find out its problems, and then, the HARQ Type II and the HARQ Type III having the optimal performances will be analyzed. Next, the conditions for resolving the problems will be presented, and several examples will be described. Finally, the superiority of the proposed hybrid ARQ scheme will be presented by comparing the analyzed results with the simulation results.

That is, a description will be first made regarding the conditions for the HARQ Type II and the HARQ Type III according to the present invention. Next, a further description will be made regarding the relationship between the existing HARQ Type I and the new HARQ Type II and HARQ Type III, and regarding the performance analysis of them.

As mentioned above, what is most important in the HARQ Type II and the HARQ Type III is to determine a size of a first transmitted coded data block for a source data packet to be transmitted, its associated code rate and coding scheme, and determine a size of a data block used during each retransmission, its associated code rate and coding scheme. For example, assuming that a mother code has a code rate R=⅓ and the system can retransmit each coded data block three times, the code rate for each retransmission can be determined as shown in Table 1 above. Even when the resulted code rate for each retransmission is determined as shown in Table 1, there are various ways to determine the redundancy bits to be retransmitted, derived from the mother code corresponding to the respective code rates. In some cases, there is a great difference between the deteriorated performance and the improved performance, caused by the selected redundancy bits. Therefore, selecting the redundancy bits guaranteeing the optimal performance is a very important factor. Accordingly, the present invention will be described on the assumption that selection of the redundancy bits is divided into three types (a triple-retransmission method), i.e., the results of code rates are R1=1, R2=½ and R3=⅓. In addition, a general rule of selecting the redundancies at each code rate will be described with reference to the system using the convolutional codes and the turbo codes. Of course, although the redundancy selection rule may be slightly varied depending on the selected code rate, the conditions given below must be fundamentally satisfied to show (provide) the optimal performance. Thus, the redundancy selection rule may be generalized as follows.

In general, the CDMA-2000 system or the UMTS system using the convolutional codes and the turbo codes or the linear block codes for channel encoding, use symbol puncturing or symbol repetition to match coded symbols to a transmission frame rate or to perform variable rate transmission. The present invention shows that the following conditions should be duly considered and reflected to efficiently apply the HARQ Type II and the HARQ Type III, thereby guaranteeing performance of the FEC code.

Condition 1: the coded symbols output from the encoder are punctured using a uniform puncturing pattern, i.e., a periodical pattern, if possible, and the puncturing pattern is minimized.

Condition 2: the number of puncturing bits is minimized, if possible.

Condition 3: the coded symbols output from the encoder are repeated using a uniform repetition pattern, i.e., a periodic pattern, if possible, and the repetition period is minimized.

Condition 4: the number of repetition bits is maximized, if possible.

In addition, when concatenated codes such as turbo codes using iterative decoding are subjected to symbol puncturing and symbol repetition, the following conditions should be additionally considered and reflected to guarantee performance of the FEC code.

Condition 5: HARQ Type II including a first transmission data rate R1 equal to 1 transmits systematic symbols corresponding to input information words during initial transmission.

Condition 6: in an R1<1 HARQ Type III, a data block transmitted during initial transmission includes all the possible systematic symbols corresponding to the input information word, and the remaining part includes the redundancies.

Condition 7: the redundancies transmitted during each retransmission should have such a format that the redundancies output from the respective component decoders are uniformly transmitted if possible, considering the characteristic of the iterative decoder.

A reason to use Conditions 5 and 6 is because compared with non-systematic codes, the systematic codes have better performance in a good channel condition. Another reason is because as the code rate approaches to 1.0 more and more, the systematic codes have better performance compared with the non-systematic codes. By generalizing this, Condition 8 below is given.

Next, a reason for using Condition 7 will be separately described with reference to one case where the turbo codes are used and another case where the convolutional codes are used.

First, a description will be made regarding an encoder and a decoder using the turbo codes.

Figure 3:
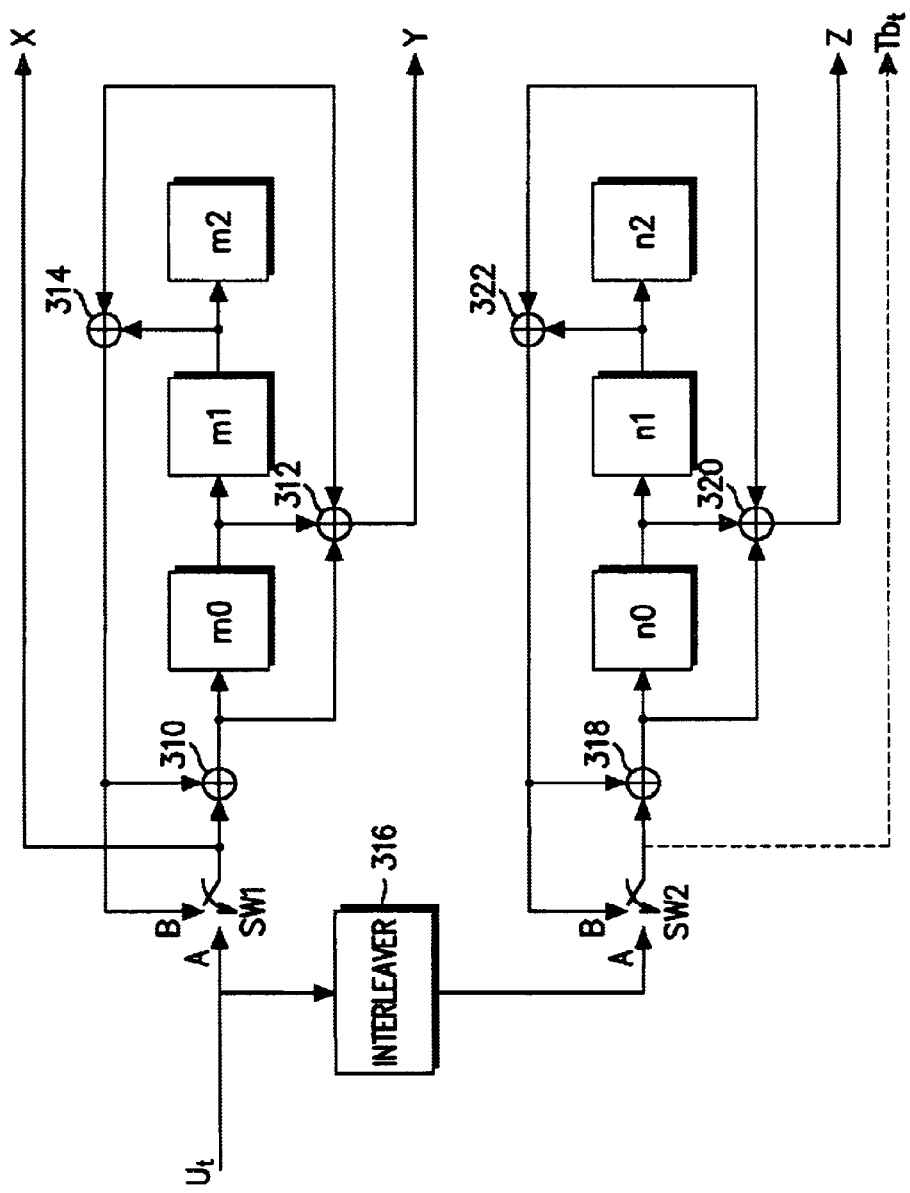
FIG. 3 is a diagram illustrating a structure of a turbo encoder having a code rate R=⅓ in a mobile communication system according to an embodiment of the present invention.
Figure 4:
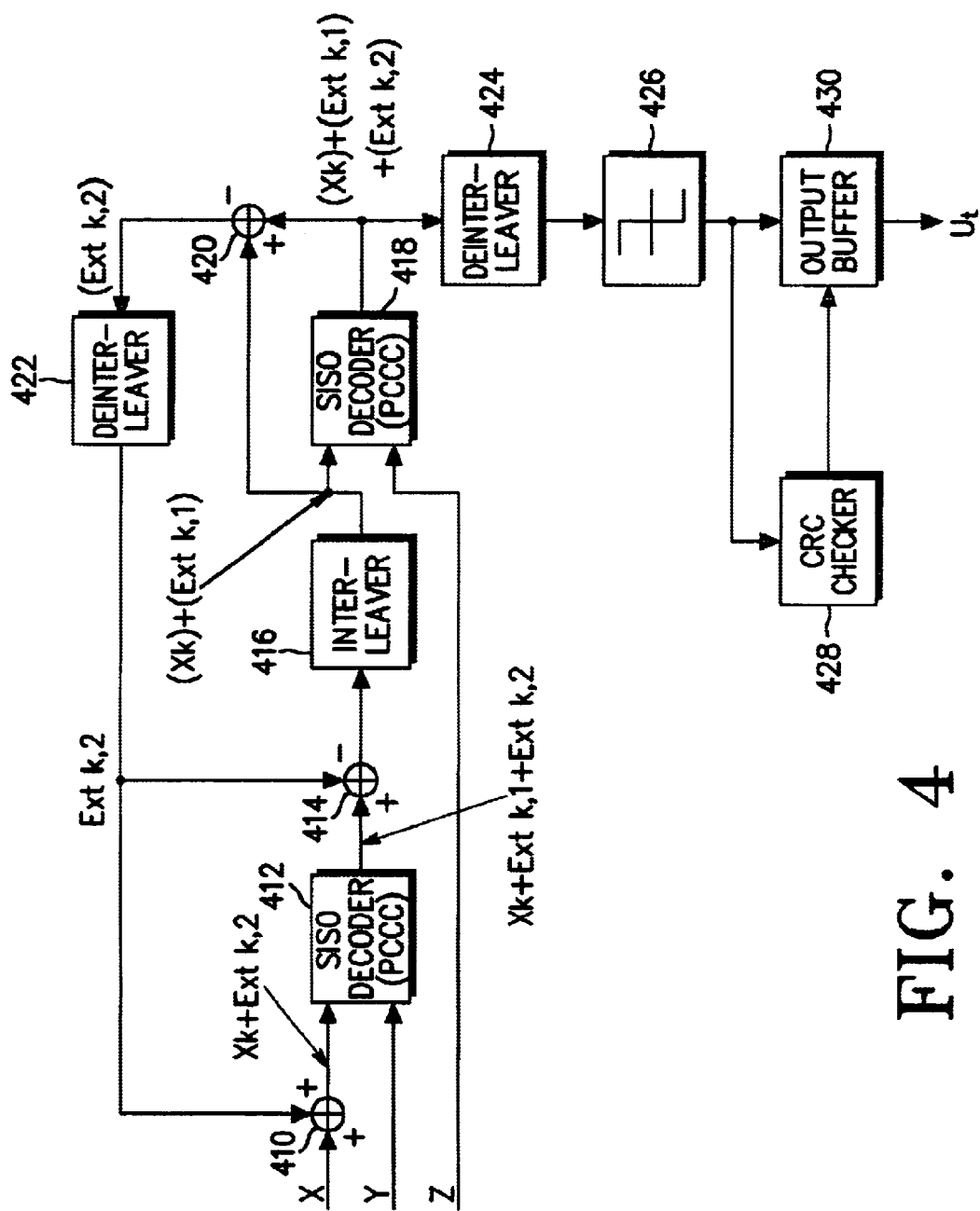
FIG. 4 is a diagram illustrating a structure of a turbo decoder having a code rate R=⅓ in a mobile communication system according to an embodiment of the present invention.

FIGS. 3 and 4 illustrate structures of an encoder and an iterative decoder using, for example, R=⅓ turbo codes, respectively.

With reference to FIG. 3, a turbo encoder according to an embodiment of the present invention will be described. A first adder 310 adds input data $U_r$ received through a switch SW1 to feedback data. Here, the intact data provided to the first adder 310 is output as first coded data X. The data output from the first adder 310 is delayed in sequence by first to third delays m0–m2. The outputs of the first delay m0 and the third delay m2 are added to the output of the first adder 310 by a second adder 312, and then, output as second coded data Y. Further, the output of the third delay m2 is added to the output of the second delay m1 by a third adder 314, and then, provided to the first adder 310 as the feedback signal.

The switch SW1 performs a switching operation depending on the feedback signal. The switch SW1 is switched to a node B to insert tail bits after completion of one-frame coding. The above elements constitute a component encoder #1.

Meanwhile, an interleaver 316 interleaves the input data $U_t$ and provides the interleaved input data to a switch SW2. A fourth adder 318 adds the interleaved input data received from the switch SW2 to feedback data. The added data output from the fourth adder 318 is delayed in sequence by fourth to sixth delays n0–n2. The outputs of the fourth delay n0 and the sixth delay n2 are added to the output of the fourth adder 318 by a fifth adder 320, and then, output as third coded data Z. In addition, the output of the sixth delay n2 is added to the fifth delay n1 by a sixth adder 322 and then, provided to the fourth adder 318 as the feedback data. The switch SW2 performs a switching operation depending on the feedback signal. The switch SW2 is switched to a node B to insert tail bits after completion of one-frame coding. The above elements constitute a component encoder #2.

As shown in FIG. 3, the turbo encoder includes a systematic part, and parity #1 and parity #2, which are redundancies: a sequence of the coded symbols will be referred to as X,Y,Z ($c_1, c_2, c_3$), for convenience. In addition, the coded symbols refer to a systematic information bit and parity bits from the component encoders #1 and #2, respectively. Since the HARQ Type I transmits all the coded symbols at once, the decoder has no difficulty in performing decoding. However, when the redundancies are separately transmitted as in the HARQ Type II and the HARQ Type III, mistransmission of the redundancies from the component encoders #1 and #2 causes drastic performance degradation at the receiver. Table 2 below shows an example of the redundancies selected from the turbo codes, and Table 3 below shows an example of coded symbol transmission patterns for the redundancies selected from the turbo codes.

TABLE 2

| | 1st Transmission | 2nd transmission | 3rd Transmission |
|---|---|---|---|
| Case 1 | X | Y | Z |
| Case 2 | X | (Y/2 + Z/2) | (Y/2 + Z/2) |
| Case 3 | (X + Y + Z)/3 | (X + Y + Z)/3 | (X + Y + Z)/3 |

TABLE 3

| | 1st Transmission | 2nd Transmission | 3rd Transmission |
|---|---|---|---|
| Case 1 | x1, x2, x3, ... xL | y1, y2, y3, y4, ..., yL | z1, z2, z3, ..., zL |
| Case 2 | x1, x2, x3, ... xL | y1, z2, y3, z4, ..., zL | z1, y2, z3, y4, ..., zL |
| Case 3 | x1, y2, z3, x4, y5, ..., zL | x2, y3, z2, x5, y6, z5, ..., y | x3, y1, z1, x6, y4, z4, ..., xL |

In Tables 2 and 3, X indicates the number of systematic information bits, Y indicates the number of parity bits from the component encoder #1, and Z indicates the number of parity bits from the component encoder #2. That is, Case 1 of Table 3 shows that x1,x2,x3, . . . , xL are transmitted during first transmission, y1,y2,y3, . . . yL are transmitted during second transmission and z1,z2,z3, . . . zL are transmitted during third transmission. It is noted in Case 1 that transmission of the redundancies is limited to the parity bits from the component encoder #1 until the second transmission. That is, only the non-interleaved information is transmitted until the second transmission. That is, since the turbo encoder does not use z1,z2,z3, . . . , zL until the second transmission, performance improvement can be achieved only to the extent of the performance of the K=4, R=½ convolutional codes for which turbo interleaving is not used. That is, it is not possible to provide a turbo interleaving gain in proportion to an input frame size, which is the most important advantage of the turbo codes. Such a problem happens when Condition 7 is not satisfied. However, in Case 2 and Case 3 shown in Table 2 and Table 3, it is noted that regarding transmission of redundancies, the parities from the component encoder #1 and the parities from the component encoder #2 are uniformly transmitted at exclusive positions until the second transmission. Therefore, from the second transmission, the turbo encoder provides performance of the K=4, R=½ turbo codes determined by symbol puncturing the K=4, R=⅓ turbo codes. This means that it is possible to provide the performance in proportion to the input frame size, which is the most important advantage of the turbo codes. However, since Case 3 fails to satisfy Condition 5 and Condition 6, the performance may be deteriorated, compared with Case 2. Therefore, Case 2 satisfying Conditions 5 to 7 can provide the optimal performance using the systematic code property of the turbo code.

With reference to FIG. 4, the iterative decoder according to an embodiment of the present invention will be described. As illustrated in FIG. 4, the iterative decoder includes two decoders. A first adder 410 adds received first coded data X to feedback data for iterative decoding, and outputs added data $X_k$+Ext. A first SISO (Soft Input, Soft Output) decoder 412 decodes the data output from the first adder 410 and received second coded data Y. A second adder 414 adds the data decoded by the first SISO decoder 412 to the feedback data. An interleaver 416 interleaves the added data output from the second adder 414. Meanwhile, a second SISO decoder 418 decodes the interleaved data output from the interleaver 416 and received third coded data Z. When there exist only the first coded data X and the second coded data Y, only the first SISO decoder 412 operates and the second SISO decoder 418 is not required to operate. Alternatively, when there exist only the first coded data X, the first SISO decoder 412 is not required to operate and only the second SISO decoder 418 performs decoding. Therefore, the iterative decoder according to the present invention can equally mix (or distribute) the coded data X, Y and Z before transmission. That is, as the encoder mixes the coded data before transmission, both the first and second SISO decoders 412 and 418 are required to operate to perform proper decoding. A third adder 420 adds the decoded data output from the second SISO decoder 418 to the interleaved data output from the interleaver 416. A first deinterleaver 422 deinterleaves the added data output from the third adder and outputs the deinterleaved data as the feedback data. A second deinterleaver 424 deinterleaves the decoded data output from the second SISO decoder 418. A decider 426 receives the deinterleaved data output from the second deinterleaver 424 and decides values of the respective symbols constituting the deinterleaved data. A CRC checker 428 performs CRC checking on the decided symbol values from the decider 426, and determines whether to retransmit the data, depending on the CRC check results. An output buffer 430 temporarily stores the decided symbol values from the decider 426, and outputs the temporarily stored symbols, i.e., the original data $U_t$ to be transmitted to the transmitter upon receipt of a no-CRC error result signal from the CRC checker 428.

As described above, the iterative decoder according to the present invention performs iterative decoding by feeding back the decoded data through the deinterleaver.

Meanwhile, it is necessary for the HARQ Type II and the HARQ Type III according to the present invention to satisfy Condition 8 below in addition to the above-stated conditions in order to improve the performance.

Condition 8: the encoder uses the systematic codes if possible, for the high-code rate codes whose code rate R1 used during initial transmission approaches very closely to 1.0.

Therefore, the HARQ Type II and the HARQ Type III must be constructed considering the above-stated conditions, in order to provide the optimal performance.

Next, a description will be made regarding an encoder and a decoder using the convolutional codes.

Figure 5A:
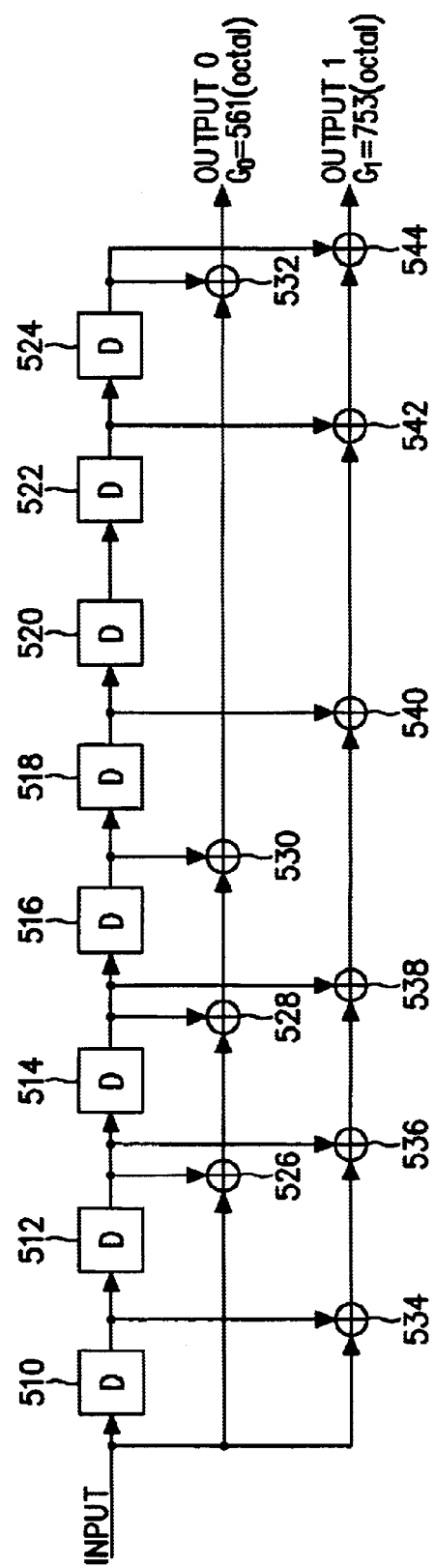
FIG. 5A is a diagram illustrating a structure of a convolutional encoder having a code rate R=½ in a mobile communication system according to an embodiment of the present invention.
Figure 5B:
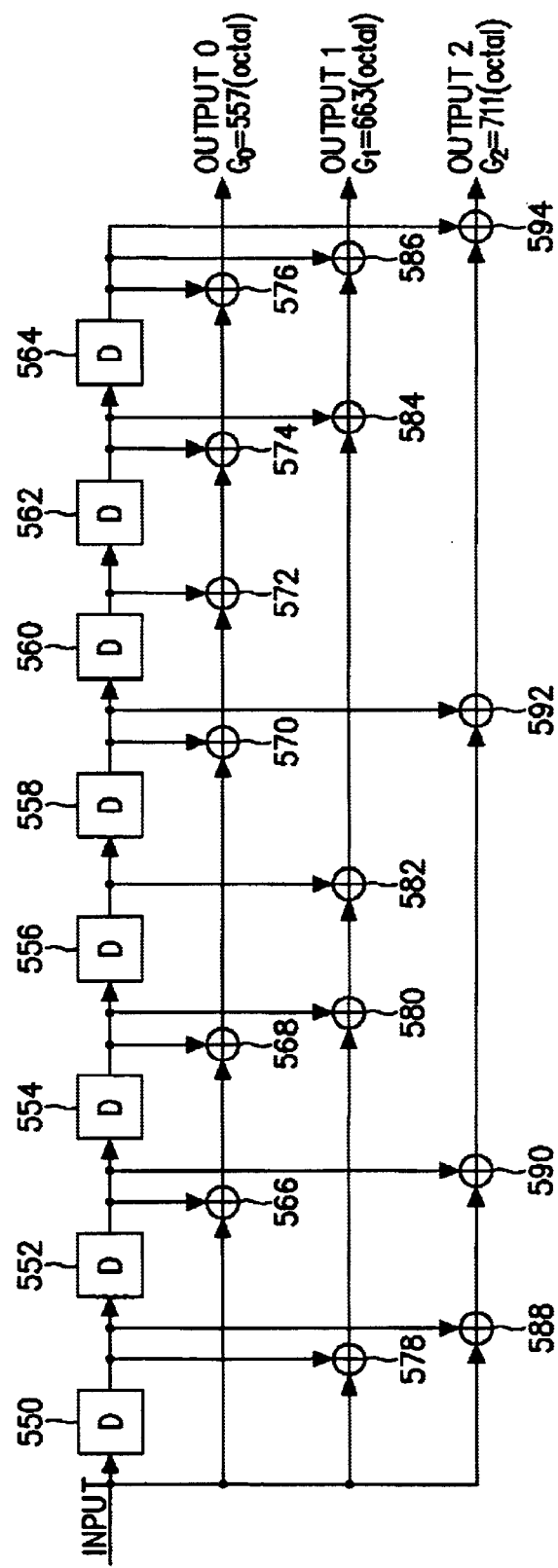
FIG. 5B is a diagram illustrating a structure of a convolutional encoder having a code rate R=⅓ in a mobile communication system according to an embodiment of the present invention.

FIG. 5A illustrates a structure of an encoder using R=½ convolutional codes and FIG. 5B illustrates a structure of an encoder using R=⅓ convolutional codes.

With reference to FIG. 5A, an encoder using the R=½ convolutional codes will be described. Input data is delayed in sequence by first to eighth delays 510–524. A first adder 526 adds the input data to the delayed data from the second delay 512, and a second adder 528 adds the output of the first adder 526 to the delayed data from third delay 514. A third adder 530 adds the output of the second adder 528 to the delayed data from the fourth delay 516. A fourth adder 532 adds the output of the third adder 530 to the delayed data from the eighth delay 524, and provides its output data as first coded data $G_0$.

A fifth adder 534 adds the input data to the delayed data from the first delay 510, and a sixth adder 536 adds the output of the fifth adder 534 to the delayed data from the second delay 512. A seventh adder 538 adds the output of the sixth adder 536 to the delayed data from the third delay 514. An eighth adder 540 adds the output of the seventh adder 538 to the delayed data from the fifth delay 518, and a ninth adder 542 adds the output of the eighth adder 540 to the delayed data from the seventh delay 522. Finally, a tenth adder 544 adds the output of the ninth adder 542 to the delayed data from the eighth delay 524, and provides its output data as second coded data $G_1$.

With reference to FIG. 5B, the encoder using the R=⅓ convolutional codes will be described. Input data is delayed in sequence by first to eighth delays 550–564. A first adder 566 adds the input data to the delayed data from the second delay 552, and a second adder 568 adds the output of the first adder 566 to the delayed data from third delay 554. A third adder 570 adds the output of the second adder 568 to the delayed data from the fifth delay 558. A fourth adder 572 adds the output of the third adder 570 to the delayed data from the sixth delay 560. A fifth adder 574 adds the output of the fourth adder 572 to the delayed data from the seventh delay 562. A sixth adder 576 adds the output of the fifth adder 574 to the delayed data from the eighth delay 564, and provides its output data as first coded data $G_0$.

A seventh adder 578 adds the input data to the delayed data from the first delay 550, and an eighth adder 580 adds the output of the seventh adder 578 to the delayed data from the third delay 554. A ninth adder 582 adds the output of the eighth adder 580 to the delayed data from the fourth delay 556. A tenth adder 584 adds the output of the ninth adder 582 to the delayed data from the seventh delay 562. An eleventh adder 586 adds the output of the tenth adder 584 to the delayed data from the eighth delay 564, and provides its output as second coded data $G_1$.

A twelfth adder 588 adds the input data to the output of the first delay 550, and a thirteenth adder 590 adds the output of the twelfth adder 588 to the delayed data from the second delay 552. A fourteenth adder 592 adds the output of the thirteenth adder 590 to the delayed data from the fifth delay 558. Finally, a fifteenth adder 594 adds the output of the fourteenth adder 592 to the delayed data from the eighth delay 564, and provides its output as third coded data $G_2$.

Next, a method for selecting redundancies of the convolutional codes and the turbo codes so as to satisfy the above-stated conditions will be described with reference to an air interface of the UMTS system. The HARQ Type II and the HARQ Type III proposed for the 3GPP system are described below by way of example. In this case, a change in the code rate from the first transmission to the third transmission is as shown in Table 1 above. That is, it is assumed that R1=1, R2=½ and R3=⅓. Here, "R2=½" means that the total code rate (the result of code rate) R2=½ when the data received during the first transmission is added to the data received during the second transmission. Further, from the third retransmission forward, the received redundancies are subjected to symbol combining to create R=⅓ codes and the created R=⅓ codes are decoded using an R=⅓ channel decoder. As mentioned above, the following transmission specification proposes a method for selecting the redundancies for one case where the convolutional codes are used and another case where the turbo codes are used. In this context, the turbo encoder and the convolutional encoder used for the 3GPP system are shown in FIGS. 3 and 5A (or 5B), respectively. Table 4 below shows the HARQ Type II and HARQ Type III transmission methods proposed for the 3GPP system.

TABLE 4

| | Event | Operation of Buffer |
|---|---|---|
| 1 | Receiving a new data block (First transmission) | If CRC check is successful, discard the received data block. If CRC check fails, save the received data block associated with block number and redundancy version. |
| 2 | Receiving a retransmitted data block with new redundancy | Output buffered versions of the received data block for combining and channel decoding. If CRC check of combined data block is successful, discard all redundancy versions of this block. If CRC check of combined data block fails, save new redundancy version and keep buffered versions. |
| 3 | Receiving a retransmitted data block with repeated redundancy | Output buffered version of the received redundancy level of the block for maximum ratio combining. Output all other buffered versions of the data block for combining and channel decoding. If CRC check of combined data block is good, discard all redundancy versions of this data block. If CRC check of combined data block is bad, save maximum ratio combined data block of the received redundancy version. |

Transmission Patterns of Convolutional Codes

Table 5 below shows methods for selecting redundancies during retransmissions of the convolutional codes. Here, the methods of Pattern 1 to Pattern 6 naturally satisfy Condition 1 and Condition 2. In addition, Pattern 7 also naturally satisfies Condition 1 and Condition 2, if (X,Y,Z) is transmitted as shown in Table 5. Of course, even at the retransmission following the fourth transmission, it is possible to maintain periodicity by repeating such Patterns and guarantee specified performance by satisfying Condition 3 and Condition 4. Regarding the convolutional codes, the most important one of the repetition patterns becomes uniform. Therefore, a periodic repetition pattern should be used, if possible. From this point of view, it is preferable to first retransmit X during retransmission for symbol combining. This is because since performing symbol combining by retransmitting X provides the minimum repetition cycle of 3, this is most preferable from the viewpoint of Dfree, the minimum distance of the code. In Table 5, Pattern 7 shows two methods of mixing (X,Y,Z) before transmission, by way of example.

TABLE 5

|  | 1st Transmission | 2nd Transmission | 3rd Transmission |
|---|---|---|---|
| Pattern 1 | X | Y | Z |
| Pattern 2 | X | Z | Y |
| Pattern 3 | Y | X | Z |
| Pattern 4 | Y | Z | X |
| Pattern 5 | Z | X | Y |
| Pattern 6 | Z | Y | Z |
| Pattern 7 | A part of (X, Y, Z) x1, y2, z3, x4, y1, z2 . . ., zL or x1, y3, z2, x4, z1, y2, . . ., zL | A part of (X, Y, Z) x2, y3, z2, x5, y6, z5, . . ., yL or x2, z3, y2, x5, z6, y5, . . ., yL | A part of (X, Y, Z) x3, y1, z1, x6, y4, z4, . . ., xL or x3, z1, y1, x6, z4, y4, . . ., xL |

Transmission Patterns of Turbo Codes

Table 6 below shows a method for selecting redundancies during retransmissions of the R=⅓ mother turbo code. Here, the methods of Pattern 1 and Pattern 2 fail to satisfy Condition 7, while other Patterns satisfy Condition 7. Of course, even at the retransmission following the fourth transmission, it is possible to maintain periodicity by repeating such Patterns and guarantee specified performance by satisfying Condition 3 and Condition 4. There are various possible methods of mixing redundancies (X,Y,Z) before transmission, and Table 6 below shows ten exemplary methods of Pattern 1 to Pattern 10. Therefore, there are many more methods satisfying Conditions 1 to 7 in addition to Patterns 1 to 10 shown in Table 6.

TABLE 6

|  | 1st Transmission | 2nd Transmission | 3rd Transmission |
|---|---|---|---|
| Pattern 1 | x1, x2, x3, . . . xL | y1, y2, y3, y4, . . ., yL | z1, z2, z3, . . ., zL |
| Pattern 2 | x1, x2, x3, . . . xL | z1, z2, z3, . . ., zL | y1, y2, y3, y4, . . ., yL |
| Pattern 3 | x1, x2, x3, . . . xL | y1, z2, y3, z4, . . ., zL | z1, y2, z3, y4, . . ., yL |
| Pattern 4 | x1, x2, x3, . . . xL | z1, y2, z3, y4, . . ., yL | y1, z2, y3, z4, . . ., zL |
| Pattern 5 | x1, y2, z3, x4, y5, . . ., zL | x2, y3, z2, x5, y6, z5, . . ., yL | x3, y1, z1, x6, y4, z4, . . ., xL |
| Pattern 6 | x1, y2, z3, x4, y5, . . ., zL | x3, y1, z1, x6, y4, z4, . . ., xL | x2, y3, z2, x5, y6, z5, . . ., yL |
| Pattern 7 | x2, y3, z2, x5, y6, z5, . . ., yL | x1, y2, z3, x4, y5, . . ., zL | x3, y1, z1, x6, y4, z4, . . ., xL |
| Pattern 8 | x2, y3, z2, x5, y6, z5, . . ., yL | x3, y1, z1, x6, y4, z4, . . ., xL | x1, y2, z3, x4, y5, . . ., zL |

TABLE 6-continued

|  | 1st Transmission | 2nd Transmission | 3rd Transmission |
|---|---|---|---|
| Pattern 9 | x3, y1, z1, x6, y4, z4, . . ., xL | x1, y2, z3, x4, y5, . . ., zL | x2, y3, z2, x5, y6, z5, . . ., yL |
| Pattern 10 | x3, y1, z1, x6, y4, z4, . . ., xL | x2, y3, z2, x5, y6, z5, . . ., yL | x1, y2, z3, x4, y5, . . ., zL |

Therefore, it is recommended that Patters 3 and 4 satisfying the given conditions should be used. However, when the turbo codes are used, use of other Patterns in Table 6 is not restricted. Heretofore, the HARQ Type II and the HARQ Type III using the same data block size during retransmissions have been mentioned. However, it is also possible to consistently apply the above-mentioned conditions even to the HARQ Type II and the HARQ Type III using different data block sizes during retransmissions. For example, it is possible to use different data block sizes during retransmissions at R1=¾, R2=⅔ and R3=⅓. That is, if a data block input to the encoder has a size L, it is possible to use the first data block with size (¾) L, the second data block with size (⅔)L and the third data block with size L. Even in this case, therefore, Conditions 1 to 7 should be considered in selecting R1=¾, R2=⅔ and R3=⅓. Furthermore, what is be considered to improve the performance is that a condition for maximizing an error correction capability of the codes used during retransmissions as well as the above-mentioned conditions should be satisfied. To this end, the above conditions should be maintained but there may exist some inconsistencies.

Performance Variation According to Selection of Code Rates

As mentioned above, what is most important in the HARQ Type II and the HARQ Type III is to determine a size of the first transmitted data block for a source data packet, its associated code rate and code, and determine a size of a data block used during each retransmission, its associated code rate and code. For example, assuming that a mother code has a code rate R=⅓ and the system can retransmit each data block three times; the code rate for each retransmission can be determined as shown in Table 1 above. However, in order to guarantee the optimal performance, it is necessary to adaptively determine the code rate according to the channel condition. However, this has a very high implementation complexity, and thus, is unlikely to be used in the high-speed data communication system. As the most efficient method in this situation, it is necessary to set the code rate R1 for initial transmission to approximately 1.0 not exactly 1. This is because when the initial code rate is R1=1.0, it is equivalent to using an uncoded system not using the FEC code. Therefore, unless the channel has a very good condition, in most cases, the first transmitted data block causes reception error at the receiver. Hence, the receiver should correct the error data block using the FEC code having a code rate R2 constructed using the redundancies received by sending a retransmission request, thereby to receive the data block successfully. This means that the throughput cannot exceed 50% fundamentally. In this case, however, if a code rate RI of the first transmitted code is lower than 1.0, i.e., if there is a high error correction capability, it is possible to perform error correction at proper S/N, thereby causing an increase in the throughput. For this reason, the following condition is required.

Condition 9: the code rate R1 of the first transmitted code should satisfy R1<1.0, and this value should be determined to the upper limit of the maximum throughput.

Here, a reason for considering the upper limit of the maximum throughput is because when the channel has a very good condition, i.e., S/N is very high, the throughput of the HARQ Type II and the HARQ Type III is saturated to RI. Therefore, in order to step up this value, RI should be approached to 1.0 as closely as possible. In this case, however, the above-mentioned problems arise. Thus, RI should be set to an optimal value between the two values.

Selection of Decoder According to Embodiment of HARQ Type II and HARQ Type III

A system using the HARQ Type II and the HARQ Type III, or the modified HARQ Type I, HARQ Type II or HARQ Type III should use the FEC code decoder satisfying the following conditions if possible, rather than the FEC code decoder used in the existing data communication system, in order to improve the performance.

Condition 10: for an FEC code decoder used in the communication system employing symbol combining or symbol puncturing, a decoder having a decoding scheme independent of the channel receive state indicators (e.g., S/N, Eb/No, Ec/No and Ec/No) or a decoding scheme less sensitive to variation in the indicators must be used if possible.

Condition 11: in a system using the HARQ Type II and the HARQ Type III or the modified HARQ Type I, HARQ Type III or HARQ Type III employing symbol combining, a decoder having a decoding scheme independent of the channel receive state indicators (e.g., S/N, Eb/No, Ec/No and Ec/Ior) or a decoding scheme less sensitive to variation in the indicators must be used, if possible, for the FEC code decoder used in the existing communication system.

The above conditions are used for the following reasons.

In general, the FEC code decoder can be distinguished into a dependent decoder and an independent decoder according to whether it is directly used in the process of decoding the channel receive state indicators (e.g., S/N, Eb/No, Ec/No and Ec/Ior) as shown in Table 7 below. That is, the FEC code decoder can be distinguished according to whether it directly uses the channel state information varying at every coded symbol. In addition, as shown in Table 7, such channel state information is reflected in a branch metric (BM) calculation process which is an initial operating process performed by most decoders from the coded symbols received for decoding. Table 7 shows a difference in the BM calculation process between a channel state information-independent decoder and a channel state information-dependent decoder. In Table 7, u1,u2,u3, . . . , ur indicate received coded symbols, and Max( ) and Min( ) indicate the maximum and minimum symbol values, respectively. In addition, ± indicates that + or − can be used according to the type of the BM. Further, δ indicates a value defined as a difference of (u1,u2, . . . ur), and f (channel information) indicates a specific function determined by a channel receive state indicator.

TABLE 7

| Channel State Info-Independent Decoder | Channel State Info-Dependent Decoder |
|---|---|
| BM = Max(u1, u2, u3, . . ., ur) or BM = Min(u1, u2, u3, . . ., ur) | BM = Max(u1, u2, u3, . . ., ur) ± δ (u1, u2, u3, . . ., ur)f(Channel information) or BM = Min (u1, u2, u3, . . ., ur) ± δ (u1, u2, u3, . . ., ur)f(Channel information) |

The various types of the channel state information-independent decoders and the channel state information-dependent decoders are given below by way of example.

Channel state information-independent decoders: Viterbi decoder, SOVA (Soft Output Viterbi Decoder), RE-SOVA (Register Exchange SOVA), Max LOG MAP decoder, Max MAP decoder Channel state information-dependent decoders: LOG MAP decoder, MAP decoder, Sub LOG MAP decoder Meanwhile, compared with the channel state information-independent decoder, the channel state information-dependent decoder provides the superior performance when provided with ideal channel state information. As shown in Table 7, the channel state information-dependent decoder uses the channel information f corresponding to every coded symbol received in the branch metric calculation process. For example, however, when the respective coded symbols have different receiving energies as in the communication system employing symbol combining and symbol puncturing, the final channel state information f corresponding to the respective received coded symbols will be varied every time even in the same channel condition. Therefore, when it is not possible to accurately estimate such channel state information, it is preferable to use the channel state information-independent decoder instead in order to provide the better performance. For example, when a value of δ (u1,u2,u3, . . . , ur)×f(Channel information) becomes larger than Max(u1,u2,u3, . . . , ur), an error having a larger value will occur.

Figure 9:
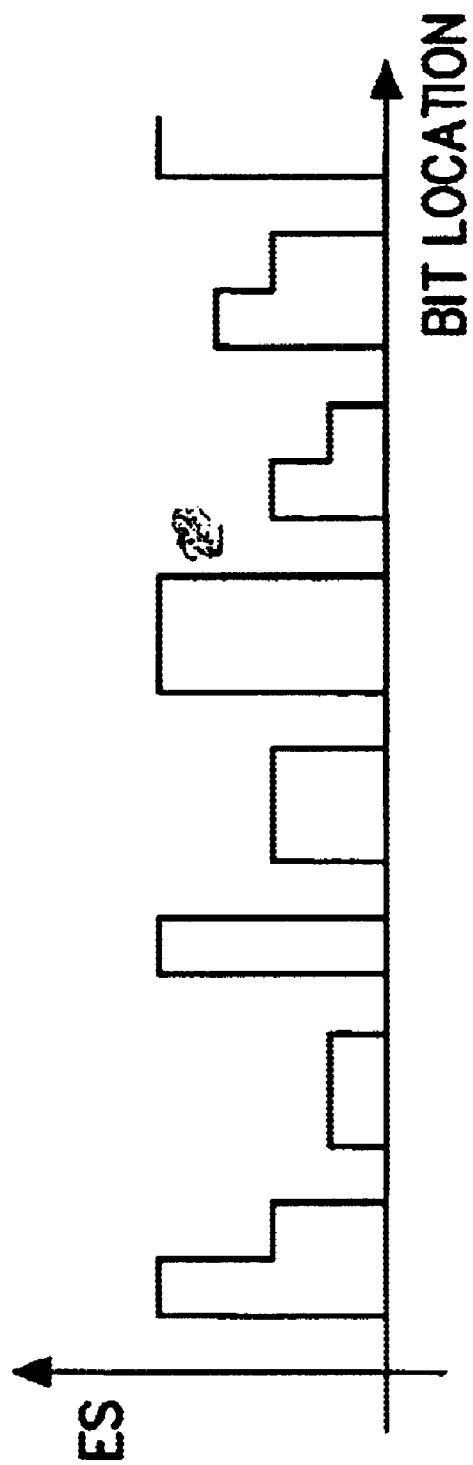
FIG. 9 is a diagram illustrating energy variation of received symbols in the hybrid ARQ scheme according to an embodiment of the present invention.

In addition, the system using the HARQ Type II and the HARQ Type III or the modified HARQ Type I, HARQ Type II or HARQ Type III employing symbol combining also has the same problem. That is, as shown in FIG. 9, when the respective coded symbols have different receiving energies according to the number of retransmissions, the final channel state information f for the respective received coded symbols varies every time even in the same channel condition. FIG. 9 is a diagram showing variation of the received symbol energy in the hybrid ARQ scheme.

Therefore, when it is not possible to accurately estimate the channel state information, it is preferable to use the channel state information-independent decoder instead in order to provide the superior performance. Actually, it is very difficult to separately set the energy variations in a symbol unit.

On the other hand, compared with the channel state information-dependent decoder, the channel state information-independent decoder shows a slight performance difference at low S/N but shows almost no performance difference at high S/N. This is because as S/N increases, the value δ(u1,u2,u3, . . . , ur) becomes very small, approaching to 0. Therefore, in consideration of the actual implementation, it is preferable to use a decoder having a decoding scheme independent of the channel receive state indicators (e.g., S/N, Eb/No, Ec/No, Ec/Ior) or a decoding scheme less sensitive to variation in the indicators.

Performance Comparison between Existing HARQ Type I and New HAQR Type II/III

Figure 7:
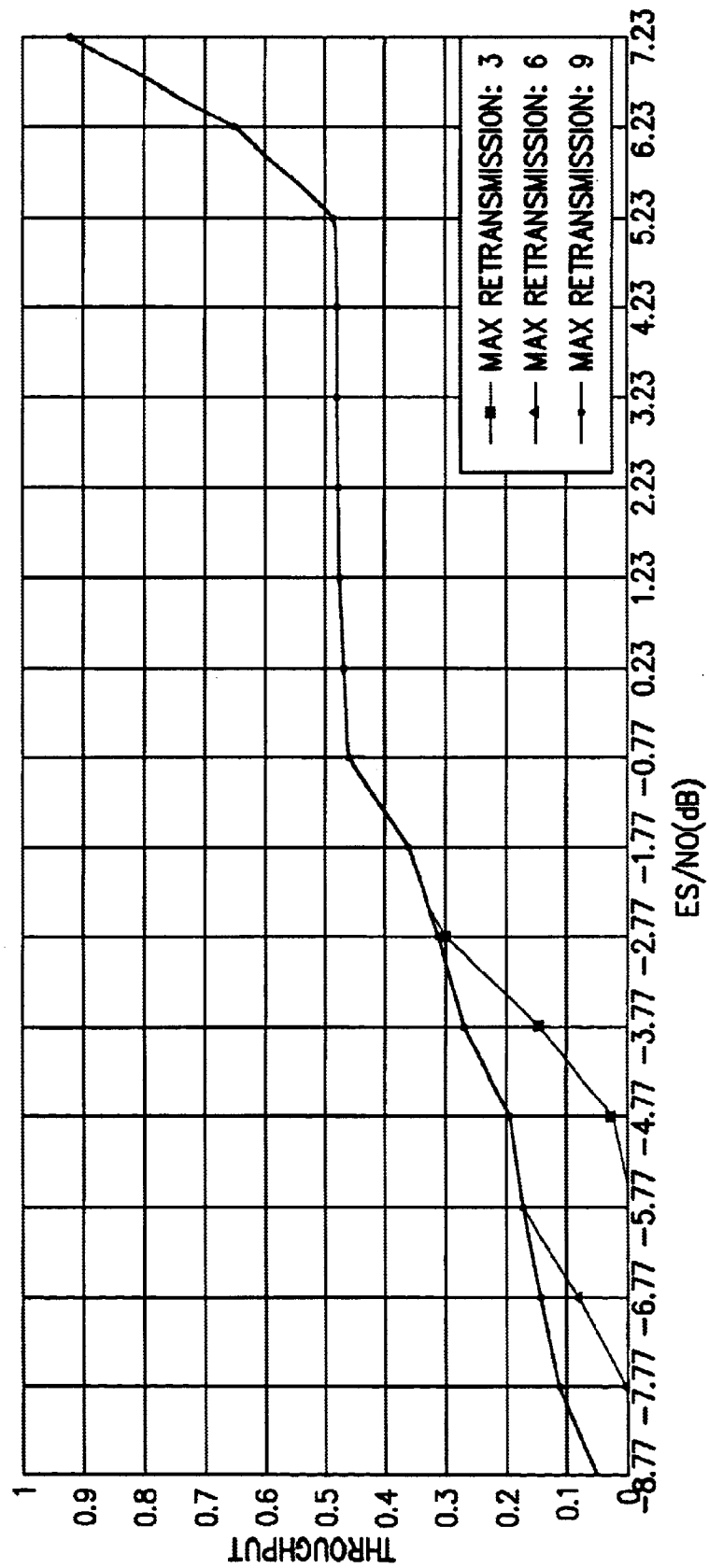
FIG. 7 is a graph illustrating the relationship between the S/N ratio and the throughput in the case where the mobile communication system using the HARQ Type II according to an embodiment the present invention uses the convolutional codes.
Figure 8:
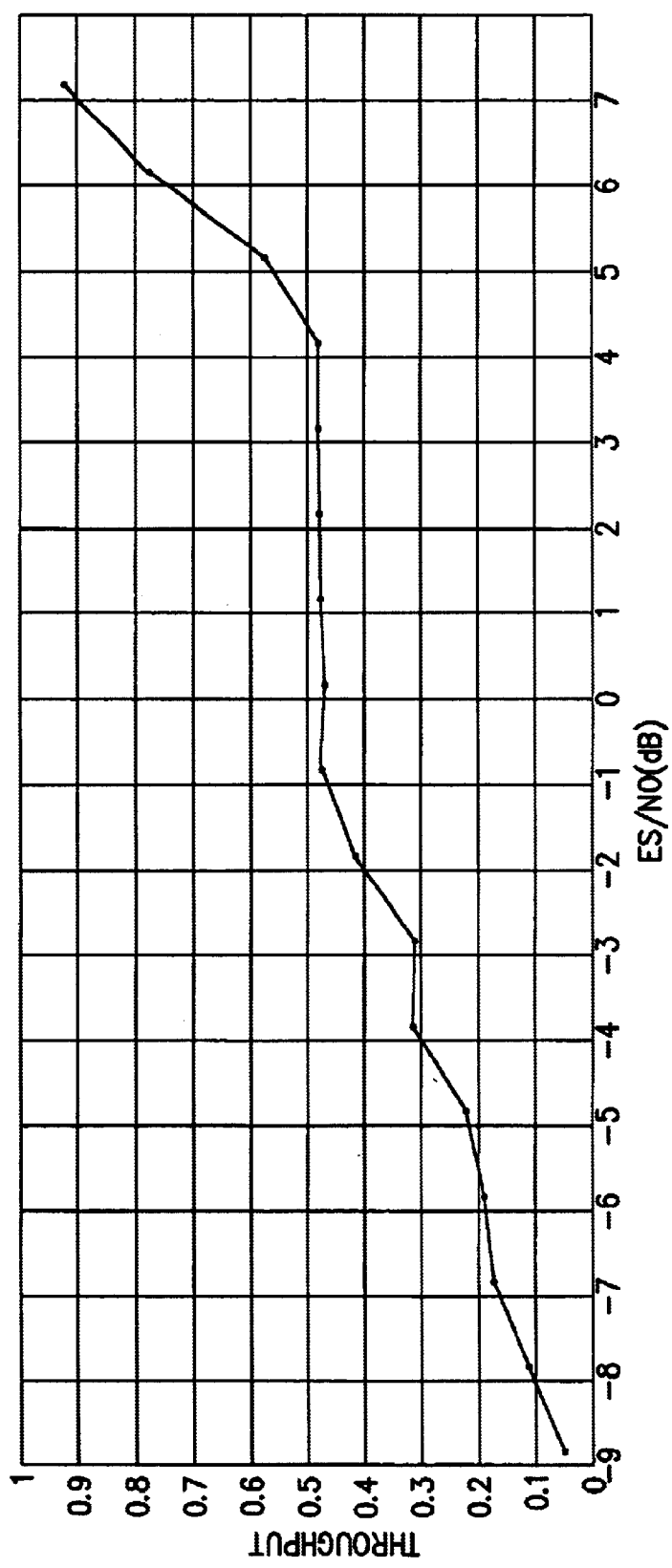
FIG. 8 is a graph illustrating the relationship between the S/N ratio and the throughput in the case where the mobile communication system using the HARQ Type II according to an embodiment the present invention uses the turbo codes.

FIGS. 7 and 8 illustrate performance in the air interface of 3GPP UMTS system using HARQ Type II. The parameters used for performance analysis in FIGS. 7 and 8 are as follows:

(1) Transport channel multiplexing structure for downlink is used according to TS25.212.

(2) One TrCH with one TrBlk: (@ 24.8 kbps, TTI=20 msec, TrBlk size=496 bits)

(3) Rate matching is not performed for simple analysis.
(4) Channel model: AWGN
(5) Channel decoders: Floating C models are used.
   Convolutional codes: Viterbi decoder
   Turbo codes: MAX LOG MAP decoder
(6) A simple HARQ TYPE II protocol with 3 steps for incremental redundancy is as follows.

The parameter (6) is shown in Table 8 below.

TABLE 8

| Event | Operation of Buffer |
| --- | --- |
| 1 Receiving a new data block (First transmission) | If CRC check is successful, discard the received data block<br>If CRC check fails, save the received data block associated with block number, redundancy version |
| 2 Receiving a retransmitted data block with new redundancy | Output buffered versions of the received data block for combining and channel decoding.<br>If CRC check of combined data block is successful, discard all redundancy versions of this block.<br>If CRC check of combined data block fails, save new redundancy version and keep buffered versions. |
| 3 Receiving a retransmitted data block with repeated redundancy | Output buffered version of the received redundancy level of the block for maximum ratio combing.<br>Output all other buffered versions of the data block for combining and channel decoding. If CRC check of combined data block is good, discard all redundancy versions of this data block.<br>If CRC check of combined data block is bad, save maximum ratio combined data block of the received redundancy version. |

Redundancy Selection and Combining

Figure 6A:
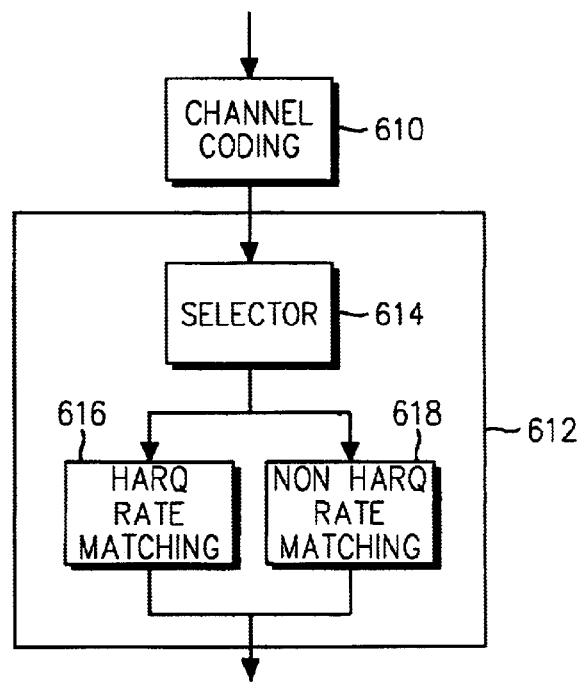
FIG. 6A is a diagram illustrating a structure of a transmitter using the HARQ Type II according to an embodiment of the present invention.
Figure 6B:
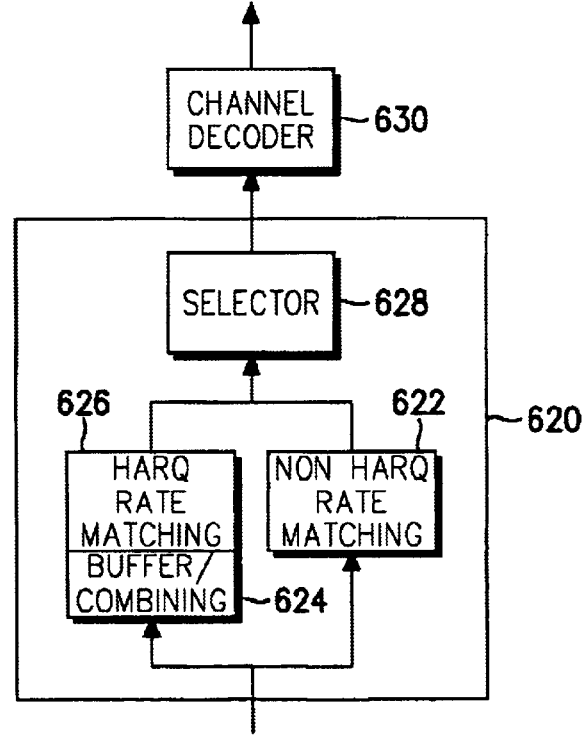
FIG. 6B is a diagram illustrating a structure of a receiver using the HARQ Type II according to an embodiment of the present invention.

To use the HAQR Type II, a transmitter shown in FIG. 6A includes a redundancy selector, and a receiver shown in FIG. 6B includes a buffer/combiner for performing symbol combining on the retransmitted redundancies.

FIG. 6A illustrates a transmitter based on the HARQ Type II and FIG. 6B illustrates a receiver based on the HARQ Type II, by way of example.

Referring to FIG. 6A, a channel coding part 610 performs channel coding on transmission data in several channel coding methods. A redundancy selector 612 divides the channel-coded data into a predetermined number of data blocks, uniformly mixes the divided data blocks at every retransmission request, and transmits them at the exclusive positions. That is, the redundancy selector 612 rate-matches the channel-coded data on either an HARQ basis or a non-HARQ basis. The redundancy selector 612 is comprised of a selector 614, an HARQ rate matching part 616, and a non-HARQ rate matching part 618. The selector 614 switches the channel-coded data provided from the channel coding part 610 to either the HARQ rate matching part 616 or the non-HARQ rate matching part 618 according to whether the HARQ Type II is to be used. The HARQ rate matching part 616 divides the data from the selector 614 into a predetermined number of data blocks, equally mixes the divided data blocks at every retransmission request, and then transmits the mixed data blocks at the exclusive positions. The non-HARQ rate matching part 618 transmits the data from the selector 614 on a non-HARQ basis.

That is, as shown in FIG. 6A, the HARQ Type II transmitter according to the present invention is such constructed as to transmit the data on either an HARQ basis or a non-HARQ basis according to the HAQR type to be used.

Referring to FIG. 6B, a redundancy selector 620 performs rate dematching the transmitted or retransmitted data on either an HARQ basis or a non-HARQ basis. The redundancy selector 620 is comprised of a buffer/combiner 624, an HARQ rate dematching part 626, a non-HARQ rate dematching part 622, and a selector 628. The buffer/combiner 624 buffers the retransmitted data and performs symbol combining on the redundancies of the retransmitted data. The HARQ rate dematching part 626 performs rate dematching on the data from the buffer/combiner 624 on an HARQ basis. The non-HARQ rate dematching part 622 performs rate dematching on the retransmitted data on a non-HARQ basis. The selector 628 switches the outputs of the HARQ rate dematching part 626 and the non-HARQ rate dematching part 622. The selected data output from the selector 628 is provided to a channel decoder 630 for channel decoding.

Table 9 below shows code rates used during retransmissions based on the HARQ Type II, by way of example.

TABLE 9

| Code Rate | First Redundancy Version | Second Redundancy Version | Third Redundancy Version |
| --- | --- | --- | --- |
| 1/3 | 1 | 1/2 | 1/3 |

Meanwhile, the throughput used for performance analysis is defined by Equation (1) below.

$$\text{Throughput} = [(\text{number of received error-free } TrBLKs)/(\text{total number of transmitted } TrBLKs)] \times [(\text{number of Information bits})/\{(\text{number of information bits}) + (\text{number of } CRC \text{ bits}) + (\text{number of tail bits})\}] \quad (1)$$

As shown in FIG. 7, compared with the existing HARQ Type II, the new HARQ Type II using the convolutional codes has the increased throughput. For example, at $Es/No = 0.23$ dB, since the existing HARQ Type I has the code rate $R = 1/3$, the maximum throughput cannot exceed 33%. However, the novel HARQ Type II can provide the maximum throughput of 48%. In particular, an increase in Es/No causes an increase in the throughput, and the throughput becomes about 90% at $Es/No = 7.23$ dB. In addition, it is noted that the throughput varies at low Es/No because of the restriction of retransmissions. An increase in the retransmissions causes an increase in the throughput. The parameters used herein are shown in Table 9 below.

TABLE 9

| Channel | AWGN |
| --- | --- |
| Information Size | 496 |
| CRC | 16 |
| Coding Scheme | Convolutional Code |
| Code Rate | 1/3 |
| Rate Matching Ratio | 1.0 |
| Information Pattern | 111111 . . . |

Next, Table 10 below shows performance differences according to the transmission patterns.

TABLE 10

|  | 1 dB | 5 dB | 10 dB |
| --- | --- | --- | --- |
| XYZ | 2.79e-01 | 4.98e-01 | 6.80e-01 |
| YZX | 2.86e-01 | 5.00e-01 | 6.94e-01 |
| ZXY | 2.87e-01 | 4.98e-01 | 7.04e-01 |

As shown in Table 10, the change in transmission pattern (X,Y,Z) rarely affects the performance.

FIG. 8 illustrates the throughput of the HARQ Type II using R=⅓ turbo codes according to an embodiment of the present invention.

Compared with the existing HARQ Type I, the new HARQ Type II using the turbo codes shows the remarkably increased throughput. For example, at Es/No=0.23 dB, since the existing HARQ Type I has the code rate R=⅓, the maximum throughput cannot exceed 33%. However, the novel HARQ Type II can provide the maximum throughput of 48%. That is, an increase in Es/No causes an increase in the throughput, and the throughput becomes about 90% at Es/No=7.23 dB. In addition, it is noted that the throughput varies at low Es/No because of the restriction of retransmissions. An increase in the retransmissions causes an increase in the throughput. Furthermore, it is noted that at low Es/No, the turbo codes show the higher throughput than the convolutional codes. This satisfies the above-mentioned Condition 8: the convolutional codes used herein are non-systematic codes and the turbo codes used therein are systematic codes. Therefore, at low Es/No, the turbo codes show the higher throughput than the convolutional codes. In addition, even at high Es/No, the turbo codes show the higher throughput than the convolutional codes, which profit is made because the turbo codes are the systematic codes.

As described above, the present invention not only increases reliability of the data communication system but also improves the throughput, thus contributing to performance improvement of the next generation mobile communication system as well as the data communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a sequence of information bits and sequences of parity bits in an HARQ (Hybrid Automatic Repeat Request) transmission system including a turbo encoder for receiving a L input information bits and generating a coded data, the L information bits and M ($\geq 2$) sequences of L parity bits for the input information bits, the method comprising the steps of:
    transmitting the L information bits and part of sequences of the parity bits determined by one of two integers closer to (N1−L)/M where N1 indicates a number of transmission bits given when an initial transmission code rate of the turbo encoder is below 1 during initial transmission; and
    at a receiver's retransmission request due to failure to receive the information bits transmitted during the initial transmission, transmitting part of sequences of parity bits determined by one of two integers closer to N2/M where N2 indicates a number of the transmission bits given when a retransmission code rate of the turbo encoder is below 1.

2. The method as claimed in claim 1, further comprising the step of transmitting the sequence of L information bits when the initial transmission code rate of the turbo encoder is 1 during initial transmission, and transmitting a part of sequence of L parity bits determined by adding up L/M parity bits provided from each sequence of parity bits at a receiver's retransmission request due to failure to receive the information bits transmitted during the initial transmission.

3. The method as claimed in claim 1, wherein the initial transmission code rate of the turbo encoder during the initial transmission is determined by predetermined maximum throughput of the turbo encoder.

4. The method as claimed in claim 1, wherein the initial transmission code rate of the turbo encoder during the initial transmission is less than 1 and not equal to 1.

5. A method for transmitting a sequence of information bits and sequences of parity bits to an HARQ (Hybrid Automatic Repeat Request) receiver in an HARQ transmission system including a turbo encoder for receiving a L input information bits and generating a coded data, the L information bits and part of M sequences of parity bits for the information bits, wherein M is determined depending on a transmission code rate, the method comprising the steps of:
    determining an initial transmission code rate depending on the transmission code rate and a possible retransmission number during initial transmission, and including the sequence of information bits in an initial data block transmitted at the determined initial transmission code rate; and
    upon every receipt of a retransmission request from the HARQ receiver, determining a retransmission code rate depending on the initial transmission code rate, a possible transmission number and a retransmission-attempted number, and uniformly including non-transmitted parity bits out of parity bits provided from each sequence of the parity bits in a data block retransmitted at the determined retransmission code rate.

6. The method as claimed in claim 5, wherein the initial transmission comprises the step of transmitting through the initial data block the L information bits and part of sequences of parity bits determined by one of two integers closer to (N1−L)/M where N1 indicates a number of transmission bits given when the determined initial transmission code rate is below 1.

7. The method as claimed in claim 6, wherein the retransmission comprises the step of transmitting part of sequences of parity bits determined by one of two integers closer to N2/M, where N2 indicates a number of transmission bits given when a retransmission code rate of the turbo encoder is below 1 at the retransmission request.

8. The method as claimed in claim 7, wherein the determined initial transmission code rate is less than 1 but not equal to 1.

9. The method as claimed in claim 5, wherein the initial transmission comprises the step of transmitting the L information bits through the initial data block when the determined initial transmission code rate is 1.

10. The method as claimed in claim 9, wherein the retransmission step comprises the step of transmitting part of sequence of L parity bits determined by adding up L/M parity bits provided from each of the M sequences of parity bits when a retransmission code rate of the turbo encoder is 1 at the retransmission request.

11. The method as claimed in claim 5, wherein the initial transmission code rate is determined by predetermined maximum throughput of the turbo encoder.

12. An apparatus for transmitting a sequence of information bits and sequences of parity bits to a receiver in a transmitter of an HARQ (Hybrid Automatic Repeat Request) transmission system, the apparatus comprising:
    a turbo encoder for receiving a L input information bits, and generating the sequence of L information bits and part of M sequences of L parity bits for the information bits, wherein M is determined depending on a transmission code rate; and
    a redundancy selector for including the L information bits in an initial data block during initial transmission, and uniformly including non-transmitted parity bits out of parity bits provided from each sequence of the parity bits in a retransmission data block upon every receipt of a retransmission request from the receiver.

13. The apparatus as claimed in claim 12, wherein a number of the information bits transmitted by the initial data block is determined by an initial transmission code rate determined depending on the transmission code rate and a possible transmission number.

14. The apparatus as claimed in claim 13, wherein the transmitter transmits through the initial data block the L information bits and part of sequences of parity bits determined by one of two integers closer to (N1−L)/M where N1 indicates a number of transmission bits of the initial data block given when the determined initial transmission code rate is below 1.

15. The apparatus as claimed in claim 13, wherein the transmitter transmits the L information bits using the initial data block, when the determined initial transmission code rate is 1.

16. The apparatus as claimed in claim 12, wherein a number of the information bits transmitted by the retransmission data block is determined by a retransmission code rate determined depending on the transmission code rate, a possible retransmission number and a retransmission-attempted number.

17. The apparatus as claimed in claim 16, wherein the transmitter transmits through the retransmission data block sequences of parity bits determined by one of two integers closer to N2/M where N2 indicates a number of transmission bits given when the determined retransmission code rate is below 1.

18. The apparatus as claimed in claim 16, wherein the transmitter transmits sequence of L parity bits determine d by adding up L/M parity bits provided from each of the M sequences of parity bits, when the determined retransmission code rate is 1.

19. An apparatus for transmitting a sequence of information bits and sequences of parity bits to an HARQ (Hybrid Automatic Repeat Request) receiver in an HARQ transmission system including a turbo encoder for receiving L input information bits and generating sequences of the L information bits and part of M sequences of parity bits for the information bits, wherein M is determined depending on a transmission code rate, the apparatus comprising:

a switch for switching the sequence of the information bits and the sequence of the parity bits according as HARQ Type is used or not;

a HARQ rate matching part for receiving the sequence of the information bits and the sequence of the parity bits from the switch, including the L information bits in an initial data block during initial transmission, and uniformly including non-transmitted parity bits out of parity bits provided from each sequence of the parity bits in a retransmission data block upon every receipt of a retransmission request from the receiver; and a non-HARQ rate matching part for receiving sequences of the information bits and sequences of the parity bits from the switch and performing a rate-matching according to a general re-transmission procedure.

* * * * *